(12) United States Patent
Neal (10) Patent No.: US 7,881,547 B2
(45) Date of Patent: Feb. 1, 2011

(54) VIDEO WINDOW DETECTOR

(75) Inventor: Greg Neal, Morgan Hill, CA (US)

(73) Assignee: Genesis Microchip Inc., Santa Clara, CA (US)

(*) Notice: Subject to any disclaimer, the term of this patent is extended or adjusted under 35 U.S.C. 154(b) by 905 days.

(21) Appl. No.: 11/565,464

(22) Filed: Nov. 30, 2006

(65) Prior Publication Data

US 2008/0025631 A1 Jan. 31, 2008

Related U.S. Application Data

(60) Provisional application No. 60/834,286, filed on Jul. 28, 2006.

(51) Int. Cl.
*G06K 9/40* (2006.01)
(52) U.S. Cl. ........................... 382/254; 382/199
(58) Field of Classification Search ...................... None
See application file for complete search history.

(56) References Cited

U.S. PATENT DOCUMENTS

| | | | |
|---|---|---|---|
| 4,101,961 A * | 7/1978 | Fletcher et al. ............. | 382/132 |
| 4,577,235 A | 3/1986 | Kannapell et al. | |
| 4,612,482 A * | 9/1986 | Beamon et al. ............. | 315/371 |
| 5,546,474 A | 8/1996 | Zuniga | |
| 5,621,454 A * | 4/1997 | Ellis et al. ....................... | 725/22 |
| 5,742,704 A | 4/1998 | Suzuki et al. | |
| 5,847,773 A | 12/1998 | Lagoni et al. | |
| 6,393,148 B1 | 5/2002 | Bhaskar | |
| 7,379,594 B2 | 5/2008 | Ferman et al. | |
| 7,469,160 B2 | 12/2008 | Banks et al. | |
| 2004/0161152 A1* | 8/2004 | Marconi et al. ............. | 382/190 |
| 2005/0002566 A1 | 1/2005 | Di Federico et al. | |
| 2005/0128358 A1* | 6/2005 | Nakajima et al. ........... | 348/678 |
| 2005/0163372 A1 | 7/2005 | Kida et al. | |
| 2005/0190980 A1 | 9/2005 | Bright | |
| 2006/0239581 A1 | 10/2006 | Neuman | |
| 2007/0071334 A1 | 3/2007 | Sakaue | |

FOREIGN PATENT DOCUMENTS

EP 0 613 294 8/1994

(Continued)

OTHER PUBLICATIONS

Goh, K. H. et al., "Automatic Video Contrast Enhancement", Consumer Electronics, 2004 IEEE International Symposium on Reading, UK, Sep. 1-3, 2004, pp. 359-364.

(Continued)

*Primary Examiner*—Bhavesh M Mehta
*Assistant Examiner*—Gregory F Cunningham
(74) *Attorney, Agent, or Firm*—Beyer Law Group LLP; Lisa K. Jorgenson (57) ABSTRACT

The invention provides for automatically identifying the location of a displayed video window based upon a characterization of selected portions of the image for realness based upon a distribution of luminance values for the selected portions. The image is then searched mathematically for a large rectangle of realness, and if found, a similar operation is performed in a smaller rectangle around each of the edges of the large rectangle, in turn, zooming in to a resolution of one pixel, thus identifying the position of the edge. This process can be repeated as often as necessary in order to maintain a fix on the edges of the video window.

20 Claims, 10 Drawing Sheets

FOREIGN PATENT DOCUMENTS

| | | |
|---|---|---|
| EP | 0957631 | 11/1999 |
| EP | 1 333 665 | 8/2003 |
| EP | 1 560 417 | 8/2005 |
| GB | 2 418 316 | 3/2006 |
| WO | 9533337 | 12/1995 |
| WO | 0063838 | 10/2000 |
| WO | 0141117 | 6/2001 |

OTHER PUBLICATIONS

European Search Report dated Jan. 7, 2009 in EP Application No. 07252588.4.

European Search Report dated Jan. 7, 2009 in EP Application No. 07252587.6.

European Search Report dated Sep. 25, 2007 in EP Application No. 07252589.2.

European Search Report dated Jan. 14, 2008 in EP Application No. 07252590.0.

Partial Search Report dated Oct. 18, 2007 in Application No. 07252590.0.

Dimitrova et al., "On Selecting Video Content Analysis and Filtering", Proceedings of the SPIE, SPIE, vol. 3972, Jan. 26, 2000, pp. 359-368.

Office Action dated Apr. 13, 2010 in U.S. Appl. No. 11/525,276.

Office Action dated Sep. 30, 2009 in U.S. Appl. No. 11/525,276.

Search Report and Written Opinion dated Oct. 28, 2008 in Singapore Patent Application No. 0704723-6.

Search Report and Written Opinion dated Nov. 17, 2008 in Singapore Patent Application No. 0704764-0.

Notice of Allowance dated Jun. 29, 2010 in U.S. Appl. No. 11/525,276.

Office Action dated Apr. 23, 2010 in U.S. Appl. No. 11/613,009.

\* cited by examiner

VIDEO WINDOW DETECTOR

CROSS REFERENCE TO RELATED APPLICATIONS

This application takes priority under 35 U.S.C. 119(e) of U.S. Provisional Application No. 60/834,286 filed Jul. 28, 2006 entitled "VIDEO WINDOW DETECTOR" by Neal that is also incorporated by reference in its entirety. This application is also related to the following co-pending U.S. patent applications each of which are herein incorporated by reference in their entireties: (i) U.S. patent application Ser. No. 11/768,667, entitled "UNIVERSAL, HIGHLY CONFIGURABLE VIDEO AND GRAPHIC MEASUREMENT DEVICE" naming Neal as inventor; (ii) U.S. patent application Ser. No. 11/613,009, entitled "VIDEO CONTENT DETECTOR" naming Neal as inventor; and (iii) U.S. patent application Ser. No. 11/525,276, entitled "INTEGRATED HISTOGRAM AUTO ADAPTIVE CONTRAST CONTROL (ACC)", naming Neal as inventor.

BACKGROUND

1. Field of the Invention

This invention generally relates to improving video and graphics quality.

2. Description of Related Art

Televisions, computer monitors and other display devices exist in a great multitude of display sizes and aspect ratios. For example, conventional television displays have a 4:3 (1.33:1) aspect ratio (hereafter referred to as a standard display) while widescreen displays, such as theater or HDTV displays, have a 16:9 (1.78:1) aspect ratio. There are also still wider displays having aspect ratios of 2.39:1 or 2.35:1. Moreover, a given display unit should be able to display the great multitude of video signal formats that exist. In order for a given display unit to display a format other than its own native format, various techniques are used to shrink or extend the aspect ratio of the normative format. Many of these techniques involve projecting the normative image in its original format onto the native display and simply blackening the "gaps" where no image information exists.

Letterboxing is the practice of transferring wider video formats, such as 16:9, to more square formats while preserving the original aspect ratio. The resulting video display must include masked-off areas above and below the picture area, often referred to as black bars, or, more accurately, as mattes. In contrast, pillar boxing, or window boxing, is necessitated when video that was not originally designed for widescreen is shown on a widescreen display. The original material is shrunk and placed in the middle of the widescreen frame while vertical black bars are placed on either side. Furthermore there are sometimes instances in which standard ratio images are presented in the central portion of a letterboxed picture, resulting in a black border all around. This effect is referred to as match boxing, and obviously wastes a great deal of screen space as well as reduces the resolution of the original image.

Therefore, in some instances a substantial amount of display real estate may actually not be displaying any video at all being used to merely accommodate a black border, for example. Therefore, the presence of these blank areas not only reduces the size and/or resolution of the original image, any video enhancement or other processing would in effect be rendered useless in the blank areas resulting in inefficient use of computing and/or memory resources.

In addition to accommodating a displayed image having a format that is not native to the display screen, other situations where a video image is surrounded by a non-video background or is embedded in a non-video frame (such as a picture in picture where the secondary video is embedded in frame having a skin (such as a Windows-type border) that often includes control buttons, or information icons.

Therefore, it would be desirable to automatically determine the location of edges of a video window.

SUMMARY OF THE INVENTION

Broadly speaking, the invention relates to identifying the location of the edges of a video window in a displayed image. The invention can be implemented in numerous ways, including as a method, system, device, apparatus, or computer readable medium. Several embodiments of the invention are discussed below.

In one embodiment, a method of determining a location of a video window displayed on a display screen is described that is carried out by: receiving video frame formed of a plurality of pixels each having associated pixel data a group of which are associated with a real image, dividing the video frame into a number of regions each of which includes approximately the same number of pixels, further dividing the display into a plurality of evaluation rectangles each of which includes approximately the same number of regions, and designating a pixel coordinate corresponding to the evaluation rectangle as an edge of the video window if the evaluation rectangle is determined to encompass at least a portion of the real image.

In another embodiment, computer program product executable by a processor for determining a location of a video window displayed on a display screen. The computer program product includes computer code for receiving video frame formed of a plurality of pixels each having associated pixel data a group of which are associated with a real image, computer code for dividing the video frame into a number of regions each of which includes approximately the same number of pixels, computer code for further dividing the display into a plurality of evaluation rectangles each of which includes approximately the same number of regions, computer code for designating a pixel coordinate corresponding to the evaluation rectangle as an edge of the video window if the evaluation rectangle is determined to encompass at least a portion of the real image, and computer readable medium for storing the computer code.

In still another embodiment, an apparatus for determining a location of a video window displayed on a display screen is described that includes: means for receiving video frame formed of a plurality of pixels each having associated pixel data a group of which are associated with a real image, means for dividing the video frame into a number of regions each of which includes approximately the same number of pixels, means for further dividing the display into a plurality of evaluation rectangles each of which includes approximately the same number of regions, and means for designating a pixel coordinate corresponding to the evaluation rectangle as an edge of the video window if the evaluation rectangle is determined to encompass at least a portion of the real image.

Other aspects and advantages of the invention will become apparent from the following detailed description taken in conjunction with the accompanying drawings.

DETAILED DESCRIPTION OF SELECTED EMBODIMENTS

Reference will now be made in detail to a particular embodiment of the invention an example of which is illustrated in the accompanying drawings. While the invention will be described in conjunction with the particular embodiment, it will be understood that it is not intended to limit the invention to the described embodiment. To the contrary, it is intended to cover alternatives, modifications, and equivalents as may be included within the spirit and scope of the invention as defined by the appended claims.

In general, an image that is mostly synthetic (i.e., a low realness index) is likely to be "text" whereas a mostly "real" is most likely video. Therefore, a video window can be identified if a portion of the image having a relatively high realness index is concentrated in a rectangular area. In this situation, the resulting data is then searched mathematically for a large window of realness, and if found, a similar operation is performed in a smaller window around each of the edges of the large rectangle, in turn, zooming in to a resolution of one pixel, thus identifying the position of the edge. This process can be repeated as often as necessary in order to maintain a fix on the edges of the video window.

It should be noted, that the invention is most effective when the displayed video window is set against a synthetic background, or a background having little or no variation that as a result would mimic a synthetic background. That having been said, in an embodiment that is particularly well suited for real time evaluation of the locations of the various edges of a video window are established by forming evaluation windows around the approximate locations of the video edges, dividing the evaluation windows into approximately equal size regions, evaluating the realness of each of the regions (or the degree of synthetic-ness is just as effective), and determining if there is a transition from essentially synthetic to essentially real in an evaluation window. If such a transition is detected, then it is highly probable that a video window edge is located within the evaluation window (again presupposing that an video window edge represents the transition from synthetic to real and vice versa). If there are additional evaluation windows to be formed (the number of evaluation windows based upon the size of the original evaluation window and a desired resolution of the location of the video window edge), then in a next iteration, a reduced size evaluation window is formed and the procedure is repeated until all evaluation windows have been tested. The location of the transition is noted and saved as the best guess of the location of the video window edge.

Figure 1:
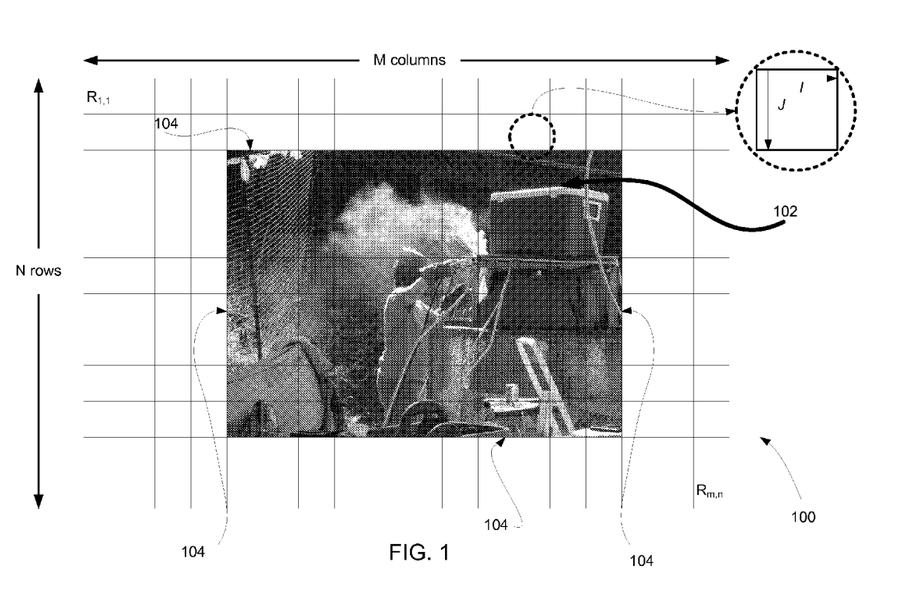
FIGS. 1 and 2 shows a representative video frame from which an image having edges is displayed in accordance with an embodiment of the invention.

FIG. 1 shows a representative video frame 100 from which an image 102 having edges 104 is displayed in accordance with an embodiment of the invention. It should be noted that it is contemplated that the image 102 is determined to be a video image (i.e., "real") prior to any determination of the video window edges using a process described in more detail in co-pending patent application entitled, "Video Content Detector" by Neal having application Ser. No. 11/613,009 incorporated by reference in its entirety for all purposes. Once it is determined that the image 102 is a video image, the invention provides for determining an approximate size and location of the video image 102 by dividing the video frame 100 into a number of regions R each being I, J pixels per side, respectively, where each of the regions includes an approximately equal number of pixels (I×J). For the remainder of this discussion, the regions R are assumed to be square regions (I=J), therefore, the video frame 100 is divided in M columns and N rows (where N and M depend upon the native aspect ration of the video frame 100) that define (M×N) number of regions $R_{m,n}$.

Once the video frame 100 has been divided in the appropriate number of regions R, each region R is characterized as being essentially real or synthetic and assigned a realness index T accordingly. In the described embodiment, the realness index T can be determined for a particular region by using the characteristic luminance distribution for each region. In the described embodiment, a luminance distribution consistent with a synthetic image for a particular region R would result in that region being assigned a realness index of $T_S$. Alternatively, if the luminance distribution of the region R is consistent with a real image, then a realness index $T_R$ (consistent with a real image) would be assigned to the region R. In some embodiments, it may be desirable to provide realness weighting factors ω that can be used to provide more (or less) weight to those regions classified as real (or, conversely, those regions considered synthetic).

Figure 2:
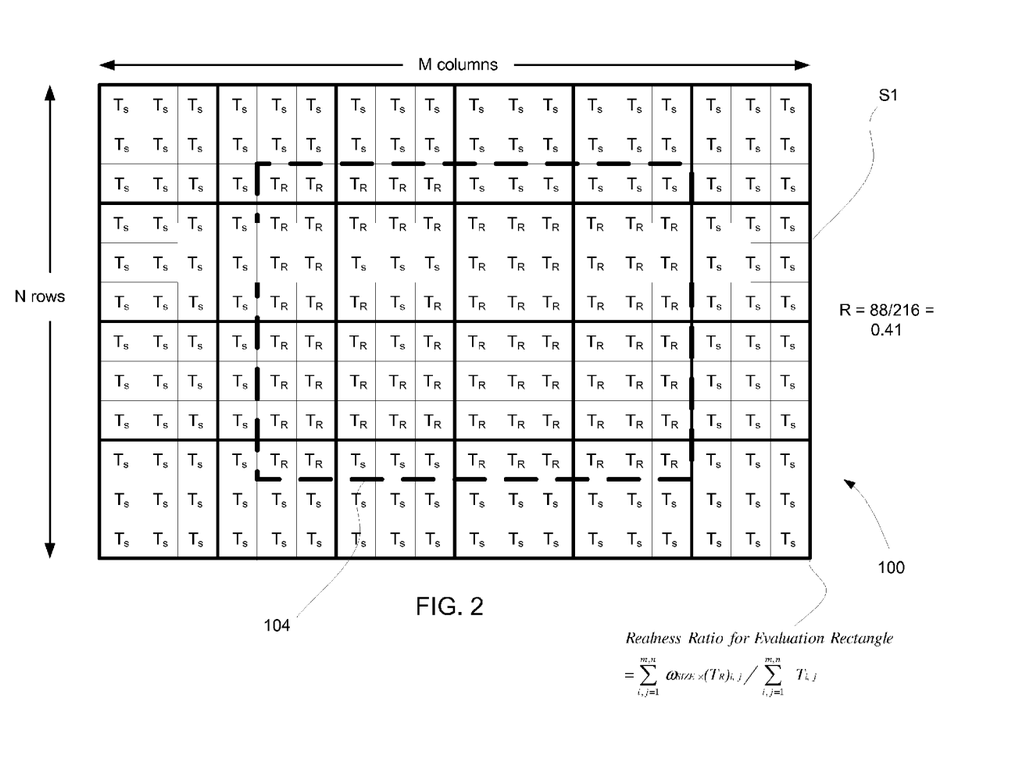
Figure 3:
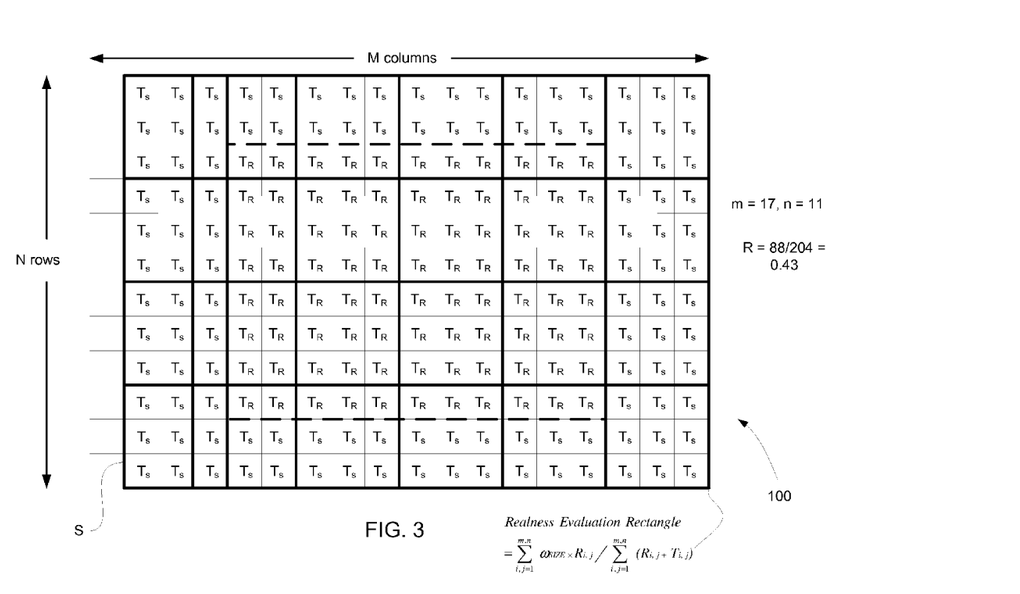
FIG. 3 shows a representative evaluation rectangle realness value comparison to a predetermined realness value threshold in accordance with an embodiment of the invention.
Figure 4:
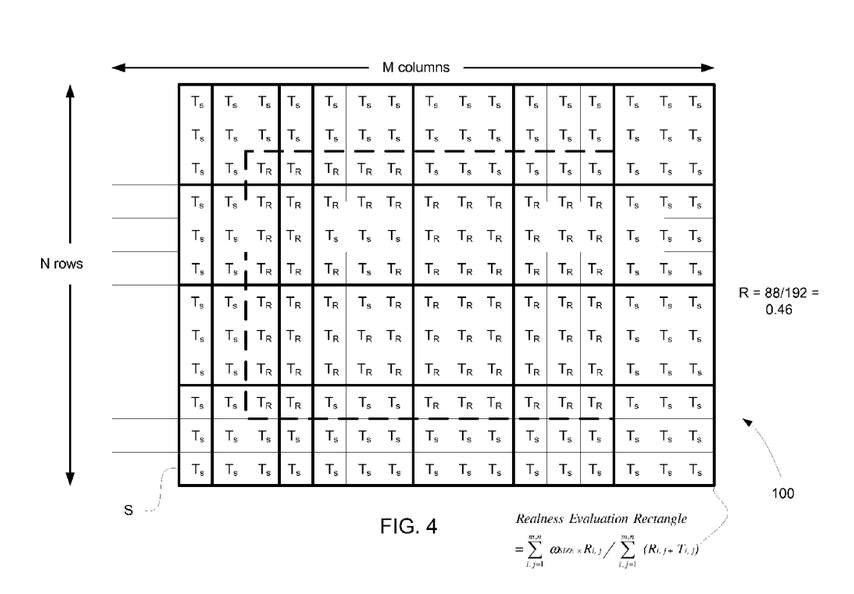
FIGS. 4-7 illustrate locating an edge of a video window in accordance with an embodiment of the invention.
Figure 5:
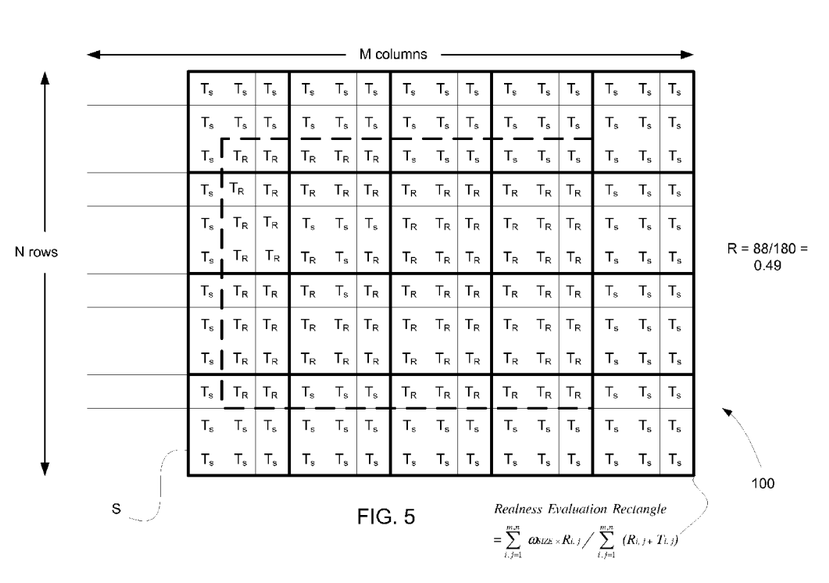
Figure 6:
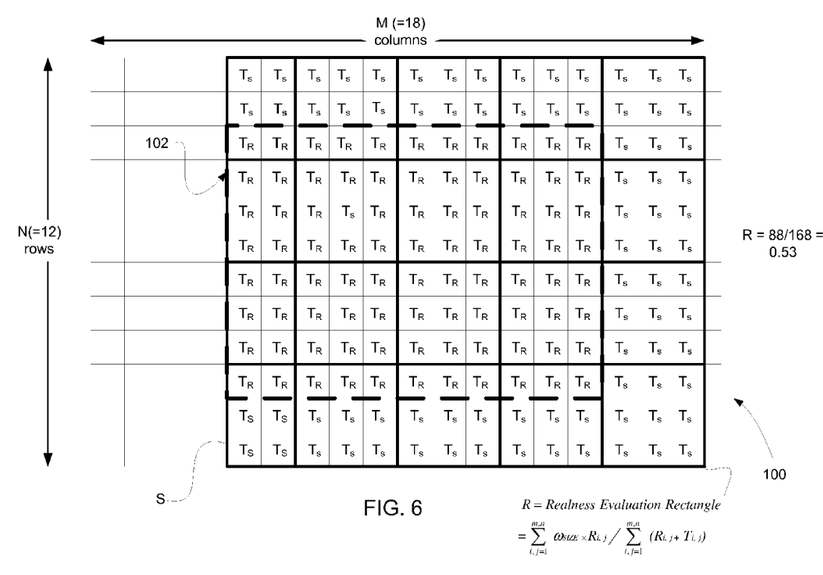

Referring now to FIG. 2 (for sake of clarity, the real image 102 has been removed leaving only the video window edges 104), once all the regions R have been indexed according to their respective realness values, a first evaluation rectangle $S_1$ is generated that incorporates a maximum number of the regions R consistent with the size of the video frame 100 thereby maximizing the probability that all or substantially all of the real image 102 will be included in the evaluation rectangle $S_1$. In any case, once the evaluation rectangle $S_1$ has been defined, all the regions R included in the rectangle $S_1$ have been identified as being either a synthetic ($T_S=1$ and $T_R=0$) or real ($T_S=0$ and $T_R=1$) that is then used to characterize the realness of the entire rectangle $S_1$ using Eq. (1):

$$\text{Realness Value}(RV) = \sum_{i,j=1}^{I,J} \omega \times T_{i,j} \qquad \text{Eq. (1)}$$

where ω is the image weighting factor (i.e., $\omega_R$ is the real image weighting factor and $\omega_S$ is the synthetic image weighting factor). Once the realness value RV for a particular evalu ation rectangle $S_1$ is calculated, a determination of the realness ratio (RR) using Eq. (2) is calculated $$\text{Realness Ratio}(RR) = \sum_{i,j=1}^{m,n} \omega_{SIZE} \times T_{Ri,j} / RV \quad \text{Eq. (2)}$$

In the described embodiment, the realness ratio RR indicates the relative proportion of real to synthetic regions encompassed by the evaluation rectangle S1. For example, FIG. 2 shows the case where the evaluation rectangle S1 encompasses the entire video frame 100 thereby assuring that at least in the first pass, the video window encompassing the real image 102 is included. In the example of FIG. 2, the realness ratio (RR) is equal to the summation of all the regions having a non-zero realness value (which in this case is 88) divided by the summation of all the realness values for the entire evaluation rectangle (which in this case is 216=M×N) giving a realness ratio RR equal to 0.41. In the ideal case, when the evaluation rectangle S encompasses only the real image 102, the realness ratio RR will be equal to 1.0, or thereabouts (since there will ideally be only real regions included in the evaluation rectangle S). Therefore, in order to determine the location of the edges 104 of the real image 102, an iterative process is performed where the realness ratio RR is evaluated and compared to a pre-determined threshold value indicative of a relative degree of realness. If the realness ration RR is not equal to or greater than the pre-determined threshold value, then another evaluation rectangle $S_n$ is generated that differs from the previous evaluation rectangle $S_{n-1}$ by size and location, for example, as illustrated in FIGS. 3-6 in order to account for as many possible sizes and locations of video windows as feasible with the processing resources available. If, however, the realness ratio RR is greater than the threshold and greater than the previous realness ratio RR, then the a stored realness ratio RR is updated to the current realness ratio RR.

Figure 7:
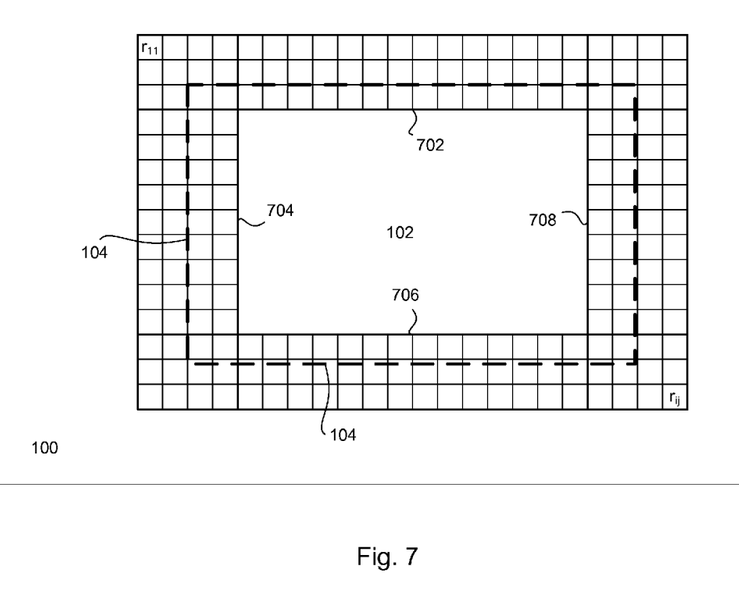
Figure 8:
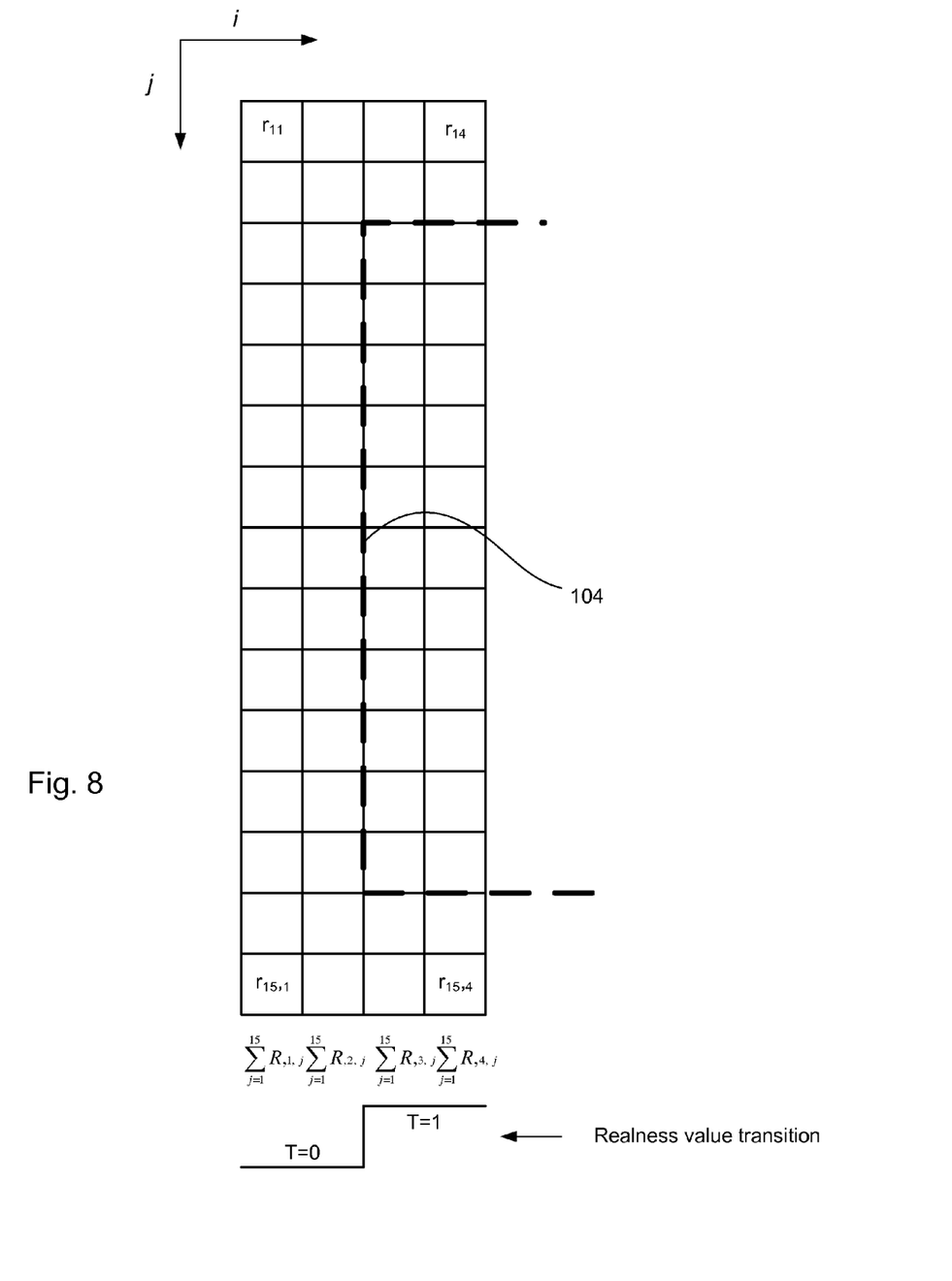
FIG. 8 shows a zoomed in evaluation rectangle in accordance with an embodiment of the invention.

Once a final evaluation rectangle is determined that approximates the location of the edges 104 of the real image 102, the approximate locations of the four edges of the real image are then overlaid by associated measurement rectangles M each of which is used to evaluate a particular location of a corresponding one of the edges. For example, FIG. 7 shows four measurement rectangles 702-708 encompassing each of the presumed locations of the four edges 104. For each edge, an edge detection procedure is carried out as illustrated in FIG. 8 using, in this example, a column-wise summation of the realness values performed for each of the columns included in the measurement rectangle 702. Once the summation of all of the realness values for each of the columns is complete, the realness summation values for each of the columns are compared to each other in order to determine if there is a transition between synthetic and real. Since it is presumed that that the portion of the displayed image that is not included in the video window is essentially all synthetic, then the edge of the video window 104 can be detected by noting the location of the transition between synthetic and real. If such a transition is noted, the location of the transition is used to form a next measurement rectangle that is reduced in size as compared to the previous measurement rectangle. In this way, the iteration is carried out until the measurement rectangle is a predetermined size that localizes the location of the edge within a predetermined metric (such as one pixel). An equivalent procedure is also carried out concurrently, if the processing resources are available, for all the edges using row-wise summation for horizontal edges thereby locating the edges 104 of the image 102.

Figure 9:
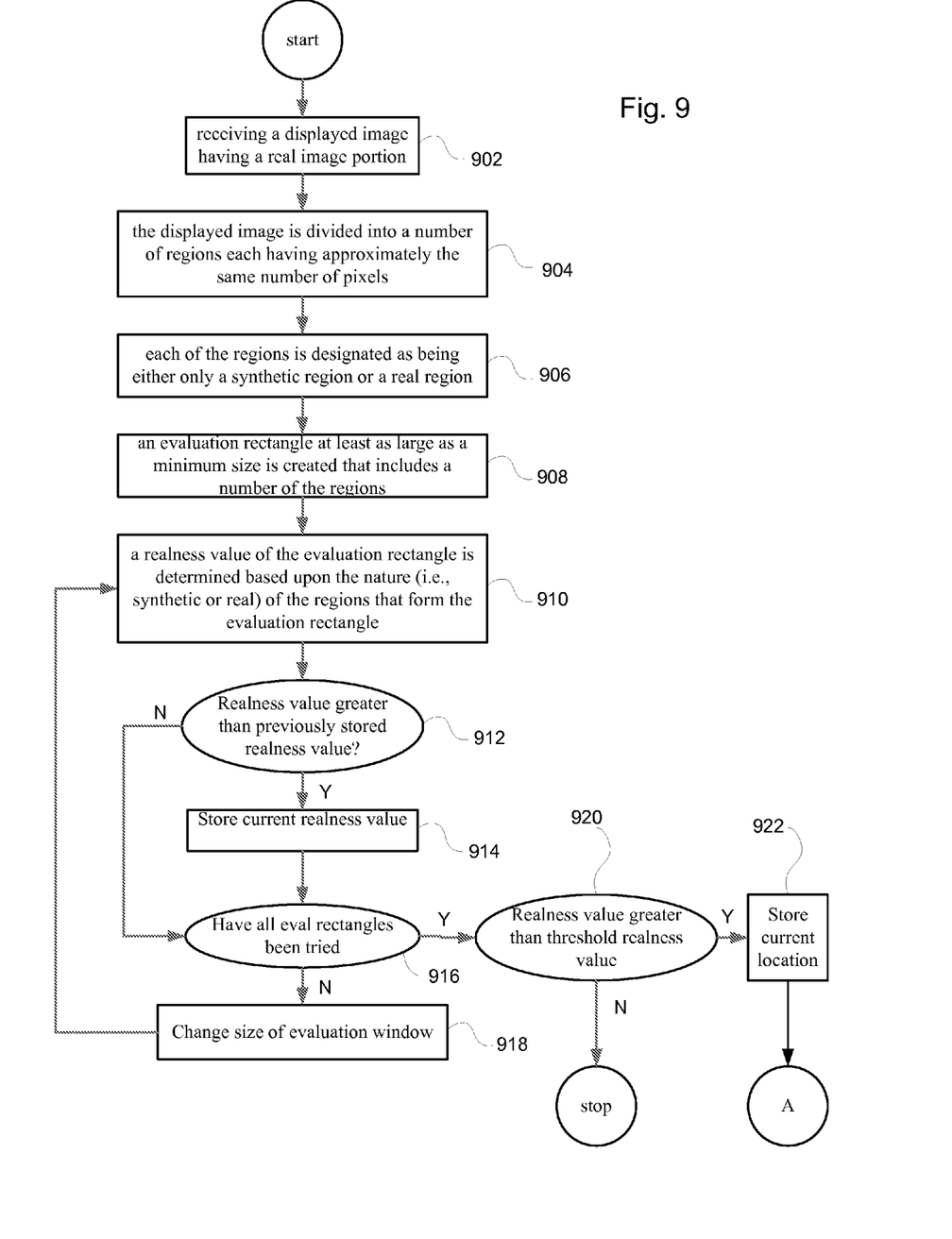
FIGS. 9-10 show a flowchart detailing a process of determining a location of a video window edge in accordance with an embodiment of the invention.

FIG. 9 shows a flowchart detailing a process 900 in accordance with an embodiment of the invention. Accordingly, the process 900 begins at 902 by receiving a displayed image having a real image portion. At 904, the displayed image is divided into a number of regions each having approximately the same number of pixels. At 906, each of the regions is designated as being either only a synthetic region or a real region. At 908, an evaluation rectangle at least as large as a minimum size is created that includes a number of regions and at 910, a realness value of the evaluation rectangle is determined based upon the nature (i.e., synthetic or real) of the regions that form the evaluation rectangle. At 912, if the realness value is greater than a previously stored realness value then the stored realness value is updated with the current realness value at 914 and in either case control is passed to 916 where a determination is made if all evaluation rectangles have been tried. If all evaluation rectangles have not been tried, then the size of the evaluation rectangle is changed at 918 and control is passed back to 910. On the other hand, if at 916 it is determined that all evaluation rectangles have been tried, then at 920, a determination is made whether or not the realness value is greater than a threshold realness value. If the realness value is not greater than the threshold realness value, then the process 900 ends, otherwise, control is passed to 922 where the approximate size and location of the real image is stored.

Figure 10:
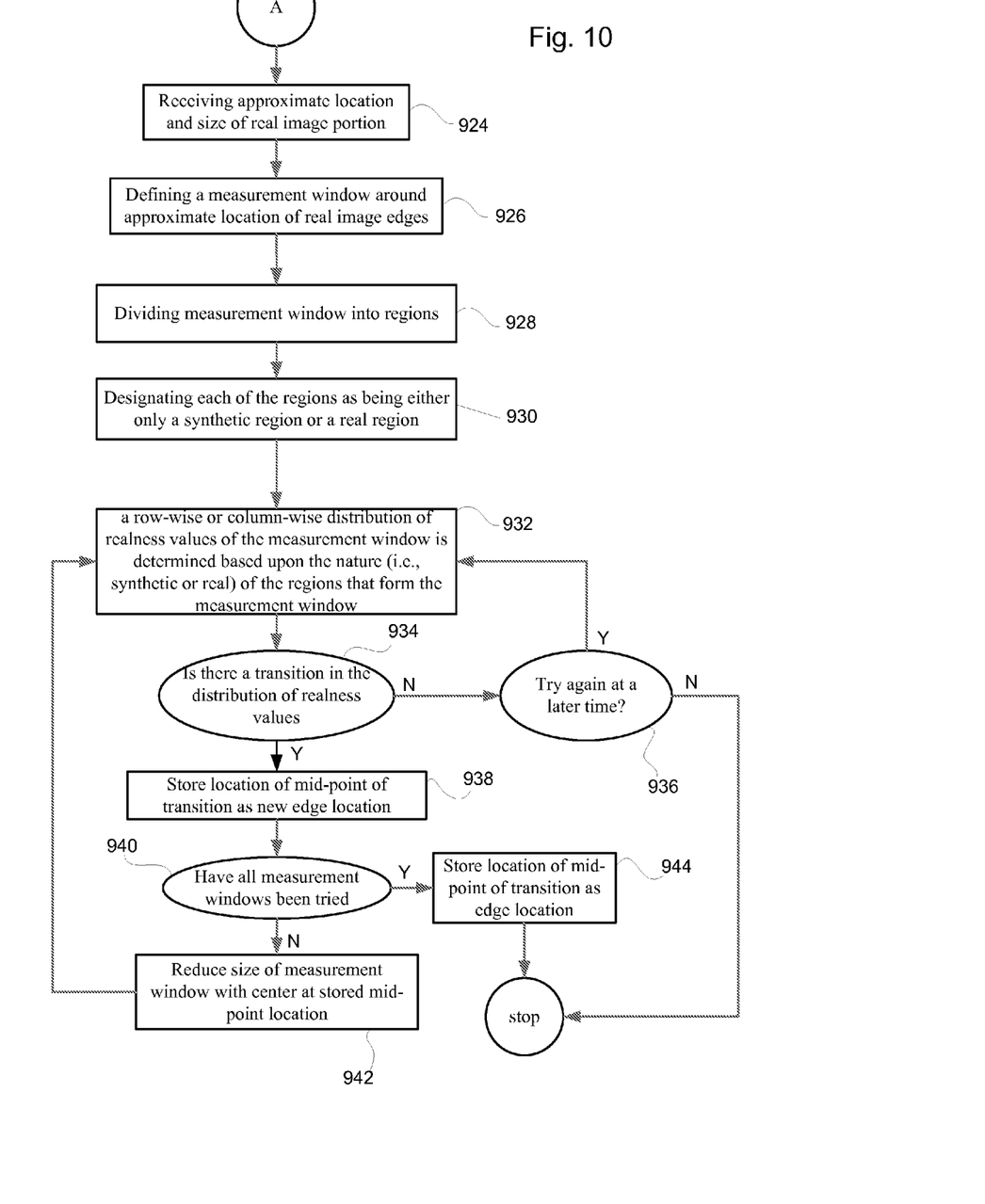

Turning now to FIG. 10, the process 900 continues at 924 by retrieving the approximate location and size of the real image previously stored. At 926, a measurement window is defined around the approximate location of the real image edges and at 928 the measurement window is divided into regions. At 930, each of the regions is designated as being either a real region or a synthetic region and at 932 a row-wise or column-wise distribution of realness values of the measurement window is determined based upon the nature of the regions that form the measurement window. At 934, a determination is made if there is a transition in the distribution of realness values. If there is no transition, then at 936 if another attempt is to be made then control is passed back to 932, otherwise the process 900 stops. On the other hand if a transition was detected at 934, then at 938 the location of the midpoint of the transition is stored as a new edge location and at 940 a determination is made if all measurement windows have been tried. If all measurement windows have not been tried, then at 942 the size of measurement window is reduced with center at stored mid-point location and control is passed back to 932 otherwise at 944 the stored location of the mid-point of the measurement window is designated as the location of an edge.

Embodiments of the invention, including the apparatus disclosed herein, can be implemented in digital electronic circuitry, or in computer hardware, firmware, software, or in combinations of them. Apparatus embodiments of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. Embodiments of the invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language.

Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

A number of implementations of the invention have been described. Nevertheless, it will be understood that various modifications may be made without departing from the spirit and scope of the invention. Accordingly, other embodiments are within the scope of the following claims.

What is claimed is:

1. A method of determining a video window displayed on a display screen, comprising:
   receiving a video frame formed of a plurality of pixels and including a real image within a background that is substantially synthetic;
   dividing the video frame into a number of regions each of which includes substantially the same number of pixels;
   further dividing the video frame into a plurality of evaluation rectangles each of which includes substantially the same number of regions;
   determining an estimate of a size and location of the video window by identifying evaluation rectangles in which there is a transition from a substantially synthetic image to the real image corresponding to an edge between the real image and the background; and
   displaying the video frame based on the determined size and location of the video window.

2. A method as recited in claim 1, wherein identifying evaluation rectangles in which there is a transition from a substantially synthetic image to a real image corresponding to an edge between the video image and the background comprises:
   characterizing each of the regions as being either a real image region or a synthetic image region;
   determining a realness value of the evaluation rectangle; and
   comparing the realness value of the evaluation rectangle to a predetermined realness threshold value.

3. A method of determining a video window displayed on a display screen, comprising:
   receiving a video frame formed of a plurality of pixels and including a real image within a background that is substantially synthetic;
   dividing the video frame into a number of regions each of which includes substantially the same number of pixels;
   further dividing the video frame into a plurality of evaluation rectangles each of which includes substantially the same number of regions; and
   determining an estimate of a size and location of the video window by identifying evaluation rectangles in which there is a transition from a substantially synthetic image to the real image corresponding to an edge between the real image and the background;
   said identifying evaluation rectangles in which there is a transition from a substantially synthetic image to a real image corresponding to an edge between the video image and the background comprises:
   characterizing each of the regions as being either a real image region or a synthetic image region;
   determining a realness value of the evaluation rectangle; and
   comparing the realness value of the evaluation rectangle to a predetermined realness threshold value;
   if the realness value of the evaluation rectangle is greater than the predetermined realness threshold value and if the evaluation rectangle is greater than a predetermined size and, then zooming in the evaluation rectangle; and
   displaying the video frame, wherein at least one characteristic of the displayed video frame is based on the determined size and location of the video window.

4. A method as recited in claim 3, wherein the zooming in the evaluation rectangle comprises;
   reducing the size of the evaluation rectangle; and
   reducing the number of pixels incorporated in evaluation rectangle commensurate with the reduced evaluation rectangle size.

5. A method as recited in claim 2, further comprising:
   if the realness value of the evaluation rectangle is not greater than the predetermined realness threshold value and if the evaluation rectangle is not located at a last evaluation position, then moving the evaluation rectangle to another location.

6. A method as recited in claim 2, wherein determining a realness value RV comprises:
   calculating the realness value RV for the evaluation rectangle using $$\text{Realness Value}(RV) = \sum_{i,j=1}^{I,J} \omega_S \times T_{S,i,j} + \omega_R \times T_{R,i,j}.$$

7. Computer program product executable by a processor for determining a video window displayed on a display screen, comprising:
   computer code for receiving a video frame formed of a plurality of pixels and including a real image within a background that is substantially synthetic;
   computer code for dividing the video frame into a number of regions each of which includes substantially the same number of pixels;
   computer code for further dividing the video frame into a plurality of evaluation rectangles each of which includes substantially the same number of regions;
   computer code for determining an estimate of a size and location of the video window by identifying evaluation rectangles in which there is a transition from a substantially synthetic image to a real image corresponding to an edge between the video image and the background; and
   a non-transitory computer readable medium for storing the computer code.

8. Computer program product as recited in claim 7, wherein the identifying evaluation rectangles in which there is a transition from a substantially synthetic image to a real image corresponding to an edge between the video image and the background, comprises:
   computer code for characterizing each of the regions as being either a real image region or a synthetic image region;
   computer code for determining a realness value of the evaluation rectangle; and computer code for comparing the realness value of the evaluation rectangle to a predetermined realness threshold value.

9. Computer program product executable by a processor for determining a video window displayed on a display screen, comprising:

computer code for receiving a video frame formed of a plurality of pixels and including a real image within a background that is substantially synthetic;

computer code for dividing the video frame into a number of regions each of which includes substantially the same number of pixels;

computer code for further dividing the video frame into a plurality of evaluation rectangles each of which includes substantially the same number of regions;

computer code for determining an estimate of a size and location of the video window by identifying evaluation rectangles in which there is a transition from a substantially synthetic image to a real image corresponding to an edge between the video image and the background wherein the identifying evaluation rectangles in which there is a transition from a substantially synthetic image to a real image corresponding to an edge between the video image and the background, comprises:

computer code for characterizing each of the regions as being either a real image region or a synthetic image region;

computer code for determining a realness value of the evaluation rectangle; and computer code for comparing the realness value of the evaluation rectangle to a predetermined realness threshold value;

computer code for zooming in the evaluation rectangle if the realness value of the evaluation rectangle is greater than the predetermined realness threshold value and if the evaluation rectangle is greater than a predetermined size; and a non-transitory computer readable medium for storing the computer code.

10. Computer program product as recited in claim 9, wherein the zooming in the evaluation rectangle comprises;

computer code for reducing the size of the evaluation rectangle; and computer code for reducing the number of pixels incorporated in evaluation rectangle commensurate with the reduced evaluation rectangle size.

11. Computer program product as recited in claim 8, further comprising:

computer code for moving the evaluation rectangle to another location if the realness value of the evaluation rectangle is not greater than the predetermined realness threshold value and if the evaluation rectangle is not located at a last evaluation position.

12. Computer program product as recited in claim 8, wherein determining a realness value RV comprises:

computer code for calculating the realness value RV for the evaluation rectangle using $$\text{Realness Value}(RV) = \sum_{i,j=1}^{I,J} \omega_s \times T_{S,i,j} + \omega_R \times T_{R,i,j}.$$

13. An apparatus for determining a video window displayed on a display screen, comprising:

a programmable system receiving video frame formed of a plurality of pixels and including a real image within a background that is substantially synthetic;

the programmable system dividing the video frame into a number of regions each of which includes substantially the same number of pixels;

the programmable system further dividing the video frame into a plurality of evaluation rectangles each of which includes substantially the same number of regions; and the programmable system determining an estimate of a size and location of the video window by identifying evaluation rectangles in which there is a transition from a substantially synthetic image to the real image corresponding to an edge between the video image and the background.

14. An apparatus as recited in claim 13, wherein the determining an estimate of a size and location of the video window, comprises:

the programmable system characterizing each of the regions as being either a real image region or a synthetic image region;

the programmable system determining a realness value of the evaluation rectangle; and the programmable system comparing the realness value of the evaluation rectangle to a predetermined realness threshold value.

15. An apparatus for determining a video window displayed on a display screen, comprising:

a programmable system receiving video frame formed of a plurality of pixels and including a real image within a background that is substantially synthetic;

the programmable system dividing the video frame into a number of regions each of which includes substantially the same number of pixels;

the programmable system further dividing the video frame into a plurality of evaluation rectangles each of which includes substantially the same number of regions; and the programmable system determining an estimate of a size and location of the video window by identifying evaluation rectangles in which there is a transition from a substantially synthetic image to the real image corresponding to an edge between the video image and the background;

wherein the determining an estimate of a size and location of the video window, comprises:

the programmable system characterizing each of the regions as being either a real image region or a synthetic image region;

the programmable system determining a realness value of the evaluation rectangle; and the programmable system comparing the realness value of the evaluation rectangle to a predetermined realness threshold value; and the programmable system zooming in the evaluation rectangle if the realness value of the evaluation rectangle is greater than the predetermined realness threshold value and if the evaluation rectangle is greater than a predetermined size.

16. An apparatus as recited in claim 15, wherein the zooming in the evaluation rectangle comprises;

the programmable system reducing the size of the evaluation rectangle; and the programmable system reducing the number of pixels incorporated in evaluation rectangle commensurate with the reduced evaluation rectangle size.

17. An apparatus as recited in claim 14, further comprising:

the programmable system moving the evaluation rectangle to another location if the realness value of the evaluation rectangle is not greater than the predetermined realness threshold value and if the evaluation rectangle is not located at a last evaluation position.

18. An apparatus as recited in claim 14, wherein the means for determining a realness value RV comprises:
the programmable system calculating the realness value RV for the evaluation rectangle using $$\text{Realness Value}(RV) = \sum_{i,j=1}^{I,J} \omega_s \times T_{S,i,j} + \omega_R \times T_{R,i,j}.$$

19. The method of claim 1, further comprising:
defining a measurement window around approximate locations of edges of the real image based on the approximate size and location of the video window; and
evaluating a transition from a synthetic image to a real image within the measurement window to determine the edges of the real image.

20. The computer program product of claim 7, further comprising:
computer code for defining a measurement window around approximate locations of edges of the real image based on the approximate size and location of the video window; and
evaluating a transition from a synthetic image to a real image within the measurement.

* * * * *